United States Patent
Li

(10) Patent No.: US 6,682,411 B1
(45) Date of Patent: Jan. 27, 2004

(54) FISH PROCESSING APPARATUS

(76) Inventor: Yu-Pin Li, 4F, No. 28, Alley 12, Lane 57, Chung Cheng Rd., Lin Kou Hsiang, Taipei Hsien (TW)

( * ) Notice: Subject to any disclaimer, the term of this patent is extended or adjusted under 35 U.S.C. 154(b) by 0 days.

(21) Appl. No.: 10/259,456

(22) Filed: Sep. 30, 2002

(51) Int. Cl.⁷ ............................................. A22C 25/02
(52) U.S. Cl. ................................................. 452/105
(58) Field of Search ................................ 452/105, 104, 452/121–123, 99, 98, 95, 94

(56) References Cited

U.S. PATENT DOCUMENTS

| | | | | |
|---|---|---|---|---|
| 3,675,273 A | * | 7/1972 | Vidjak | 452/121 |
| 3,787,927 A | * | 1/1974 | Simard | 452/99 |
| 3,793,675 A | * | 2/1974 | Hogan et al. | 452/119 |
| 4,195,387 A | * | 4/1980 | Iwase | 452/106 |
| 4,485,526 A | * | 12/1984 | Opanasenko | 452/99 |
| 4,507,823 A | * | 4/1985 | Wulff | 452/121 |
| 4,630,335 A | * | 12/1986 | Claudon | 452/121 |
| 4,811,460 A | * | 3/1989 | Emanuelsen | 452/118 |
| 4,827,571 A | * | 5/1989 | Ewing et al. | 452/106 |
| 5,026,318 A | * | 6/1991 | Jahnke | 452/116 |
| 5,033,164 A | * | 7/1991 | Miyazaki et al. | 452/161 |
| 5,083,972 A | * | 1/1992 | King | 452/108 |
| 5,184,973 A | * | 2/1993 | Orlando et al. | 452/125 |
| 5,197,916 A | * | 3/1993 | Orlando et al. | 452/125 |
| 5,352,152 A | * | 10/1994 | Claudon | 452/127 |
| 5,413,524 A | * | 5/1995 | Yoshida | 452/110 |
| 5,735,735 A | * | 4/1998 | Hahn et al. | 452/119 |
| 6,183,357 B1 | * | 2/2001 | Randolph | 452/98 |
| 6,368,203 B1 | * | 4/2002 | Puretz | 452/81 |

FOREIGN PATENT DOCUMENTS

SU 1398793 * 5/1988 ............... 452/99

* cited by examiner

Primary Examiner—Thomas Price
(74) Attorney, Agent, or Firm—Browdy and Neimark, P.L.L.C.

(57) ABSTRACT

A fish processing apparatus includes a casing in which are respectively mounted a brushing unit, a clamping unit, a pushing unit, a cutting unit, and a driving unit. The brushing unit includes two scraping brushes that are mounted in a manner to overlap each other. Each scraping brush includes an axle on which are attached a plurality of flexible bristles respectively terminating in a scraping portion. The rotation of the scraping brushes removes the scales of the fish body. The clamping unit is mounted at a location between and below the two scraping brushes to receive the fish body, and the pushing unit is placed below the clamping unit to push the fish body toward the cutting unit that cuts the fish body and removes its viscera.

8 Claims, 10 Drawing Sheets

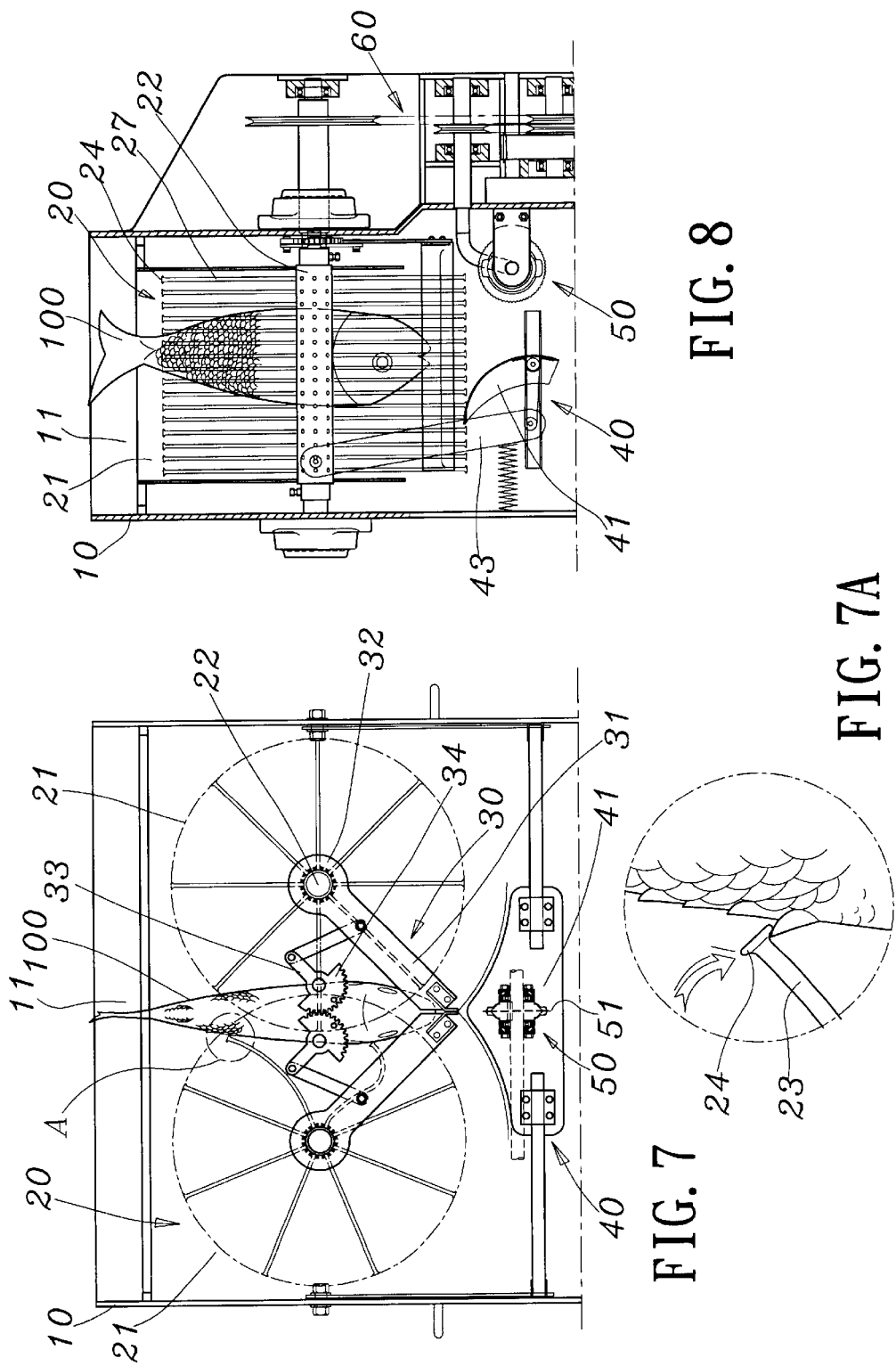

FISH PROCESSING APPARATUS

BACKGROUND OF THE INVENTION

1. Field of the Invention

The invention relates to a fish processing apparatus and, more particularly, to a fish processing apparatus that is capable of removing the scales of the fish, cutting open the belly of the fish and removing its viscera.

2. Description of the Related Art

The consumption of seafood and especially fish usually requires a preliminary preparation. In this preparation, the scales of the fish have to be removed, and the belly of the fish then has to be cut open to remove the viscera. These basic operations, if manually processed, require a substantial time, which may be inadequate if a great amount of fish is to be processed.

FIG. 1 is a schematic view illustrating a manual fish processing device known in the prior art. The known fish processing device comprises a handle 10a that is connected to a cylinder 11a. A surface of the cylinder 11a includes a plurality of sharp projections 12a used to scrape and remove the scales of the fish. The usr grips the handle 10a, and sweeps the fish body with the cylinder 11a to scrape and remove the scales of the fish. Once this operation has been achieved, the user then generally uses a knife to cut open the belly of the fish to manually remove its viscera.

A fish processing device of the prior art as described above requires a manual operation that may be time-consuming. Furthermore, the sharp projections 12a may undesirably damage the skin of the fish.

SUMMARY OF THE INVENTION

It is therefore a principal object of the invention to provide a fish processing apparatus that is automatic, can reduce the processing time of the fish, and is adapted to process fishes of different sizes.

It is another object of the invention to provide a fish processing apparatus that is capable of removing the scales of the fish without damaging its skin.

Furthermore, it is another object of the invention to provide a fish processing apparatus that is capable of adequately positioning the fish body to cut open the belly of fish and remove its viscera.

To accomplish the above and other objectives, a fish processing apparatus of the invention comprises a casing are respectively mounted a brushing unit, a clamping unit, a pushing unit, a cutting unit, and a driving unit. The brushing unit comprises two scraping brushes that are mounted in a manner to overlap each other. Each scraping brush respectively includes an axle on which are mounted a plurality of flexible bristles that respectively terminate in a scraping portion. The clamping unit is mounted at a location between and below the two scraping brushes. The pushing unit is mounted below the clamping unit. The cutting unit is mounted at one side of the pushing unit and includes a rotary cutting tool and at least a scraping ring used to remove the viscera of the fish body. The driving unit is connected to the respective axles of the scraping brushes and to the cutting unit to drive the scraping brushes and the cutting unit in rotation.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows:

FIG. 7 through FIG. 13 are several schematic views illustrating the operation of a fish processing apparatus according to an embodiment of the invention, wherein FIG. 7A is an enlarged view of the zone A of FIG. 7.

DETAILED DESCRIPTION OF THE EMBODIMENT

Figure 1:
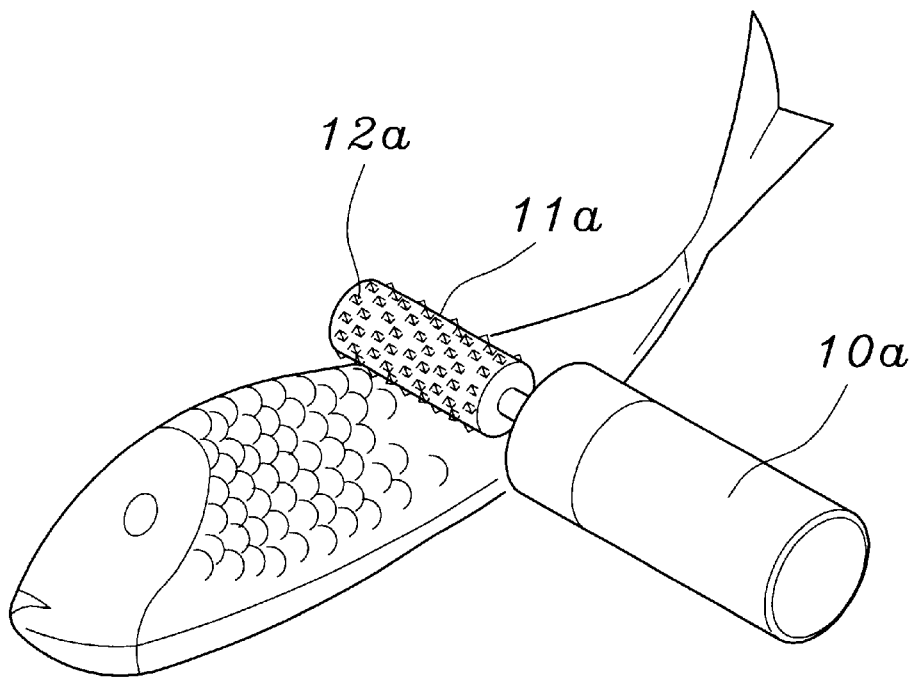
FIG. 1 is a perspective view illustrating a manual fish processing device of the prior art.

Wherever possible in the following description, like reference numerals will refer to like elements and parts unless otherwise illustrated. Hereafter, "fish body" will generally refer to the entire fish including any of its members and parts.

Figure 3:
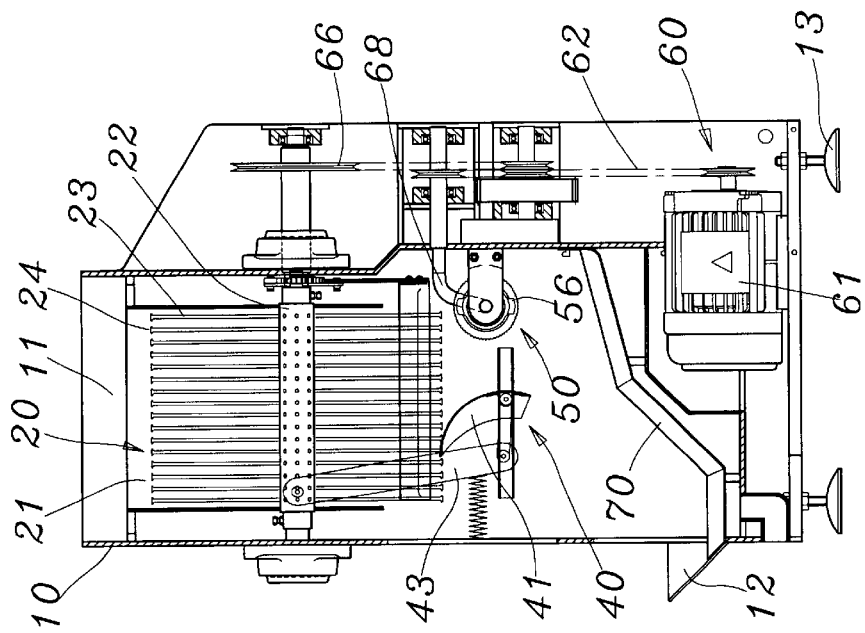
FIG. 3 is a schematic side view illustrating a fish processing apparatus according to an embodiment of the invention.
Figure 2:
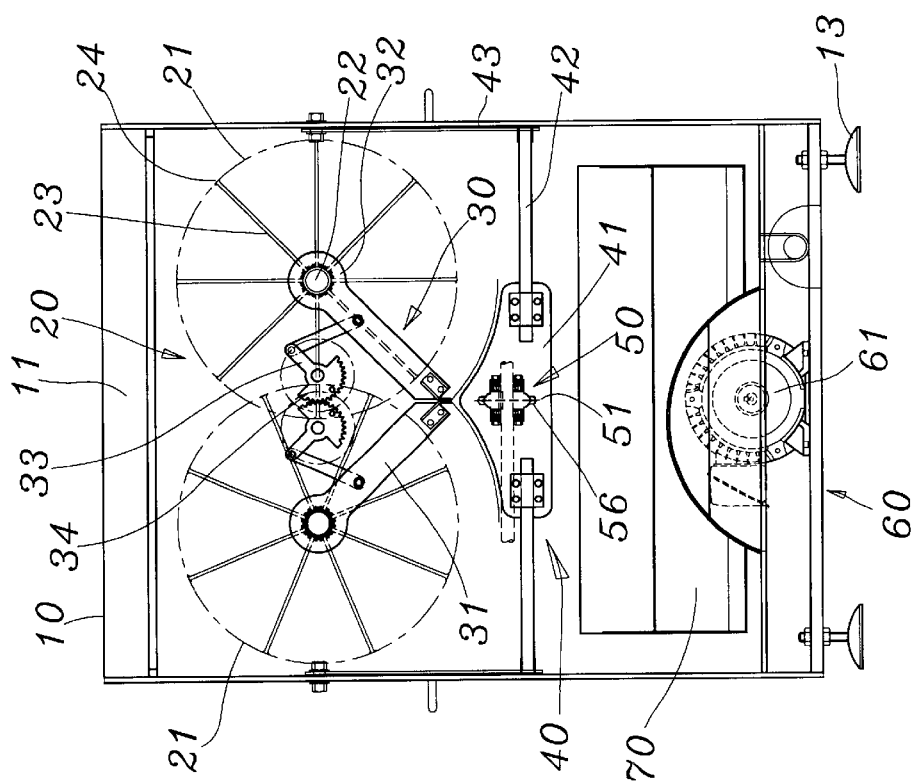
FIG. 2 is a schematic front view illustrating a fish processing apparatus according to an embodiment of the invention.

Reference now is made to FIG. 2 through FIG. 3 to describe a fish processing apparatus according to an embodiment of the invention. As illustrated, the fish processing apparatus of the invention comprises a casing 10, a brushing unit 20, a clamping unit 30, a pushing unit 40, a cutting unit 50, and a driving unit 60. The casing 10 is principally made of metallic material, forming a rigid frame structure to respectively mount and connect the brushing unit 20, clamping unit 30, pushing unit 40, cutting unit 50, and driving unit 60. A top of the casing 10 includes an insert opening 11 through which a fish body to be processed is placed inside the processing apparatus. A lateral wall of the casing 10 further includes a retrieval opening 12 through which the fish, once it processing inside the apparatus is achieved, is released. At a bottom of the casing 10, at approximately four corners, are respectively mounted a plurality of support pads 13 to support and elevate the casing 10 at an adequate height.

The brushing unit 20 comprises two scraping brushes 21 facing each other. Each scraping brush 21 is mounted to an axle 22 and comprises a plurality of flexible bristles 23. Each bristle 23 terminates in a scraping portion 24 adapted to scrape the scales of a fish body. The scraping brushes 21 are pivotally mounted in the casing 10 facing each other and partially overlapping over each other. The axles 22 of the scraping brushes 21 are connected to the driving unit 60 so that the scraping brushes 21 are driven in rotation to scrape the scales of a fish body.

Figure 4:
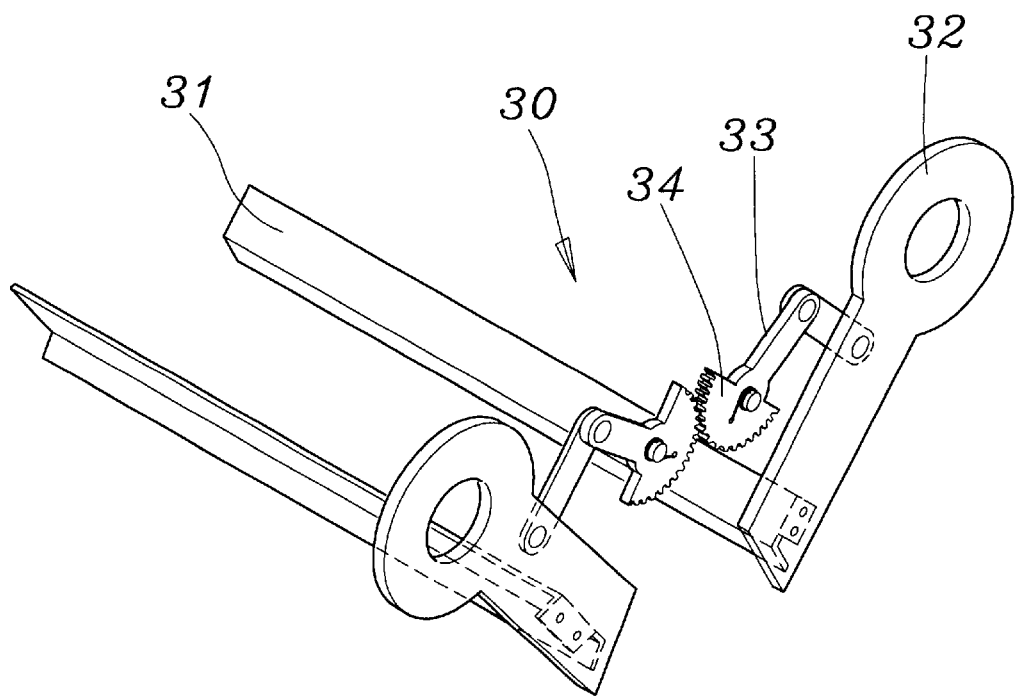
FIG. 4 is perspective view schematically illustrating the clamping unit according to an embodiment of the invention.

The clamping unit 30 is mounted between the scraping brushes 21, approximately at a lower location. The clamping unit 30 comprises two clamping arms 31 (see FIG. 4) that are respectively provided with a hinge portion 32 at one end. Through the hinge portion 32, each clamping arm 31 is pivotally connected to one axle 22 of one corresponding scraping brush 21 in a manner to be capable of freely swaying to perform clamping or releasing operations. Each of the clamping arms 31 is connected too an actuating rod 33 that is provided with an actuating toothed wheel 34. The respective actuating toothed wheels 34 of the actuating rods 33 engage with each other in a manner to synchronously actuate the clamping arms 31 to close or open relative to each other depending on whether a fish body is released from the two scraping brushes 21.

The pushing unit 40 is mounted below the brushing unit 20 and the clamping unit 30, and comprises a pushing plate 41 at two opposite portions of which are respectively attached connecting rods 42. An opposite end of each connecting rod 42 further is connected to one oscillating bar 43 having one end pivotally connected to the casing 10 according to a flexible manner. The pushing unit 40 thereby flexibly slides along a direction to push a fish body toward the cutting unit 50.

Figure 5:
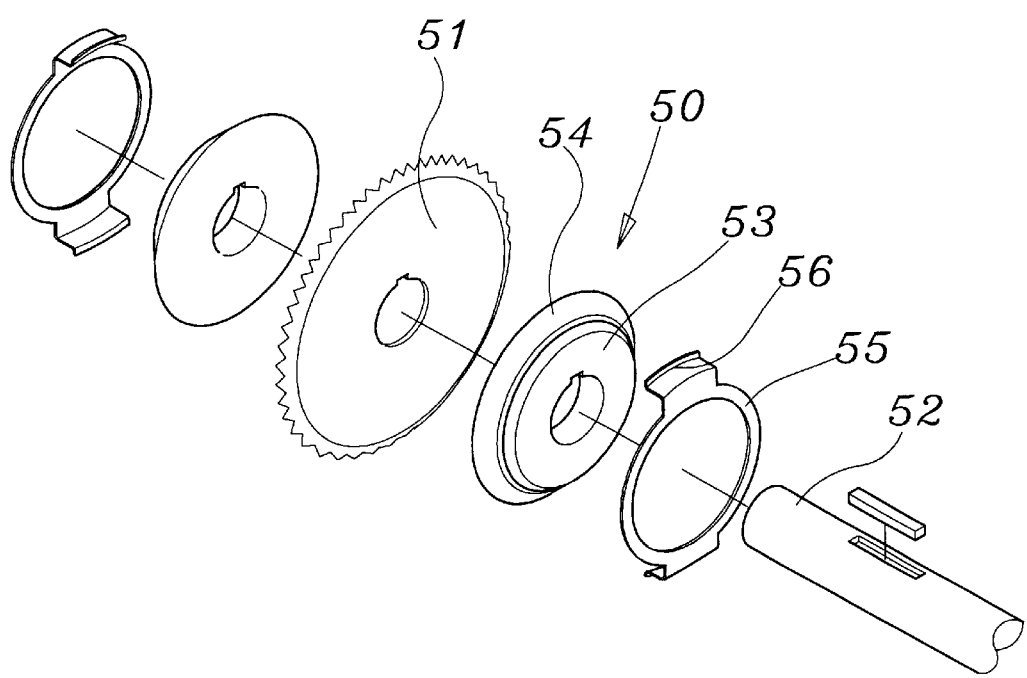
FIG. 5 is an exploded view of the cutting unit according to an embodiment of the invention.

The cutting unit 50 is mounted at one side of the pushing unit 40, and comprises a cutting tool 51 (see FIG. 5) that is fixedly mounted to a rotary axle 52, itself adequately connecting the driving unit 60 to drive the cutting tool 51 in rotation. The rotation of the cutting tool 51 enables the cutting of the belly of the fish body. At two sides of the cutting tool 51 are respectively mounted fixing plates 53 that respectively include a conical surface 54 to prevent the accumulation of viscera of the fish body. An outer side of each fixing plate 53 is further provided with a scraping ring 55 made of, for example, plastics. Each scraping ring 55 includes two protruding portions 56 used to remove the viscera of the fish body by scraping action. The cutting tool 51, fixing plates 53, and scraping rings 55 are securely fixed to the rotary axle 52 via locking elements 57 oppositely abutting against the respective outer sides of the fixing plates 53.

Inside the casing 10 and below the cutting tool 50 is mounted a receiving tray 70 made of, but not limited to, for example, metallic materials. The receiving tray 70 includes an inclined section the higher portion of which is vis-à-vis the cutting unit 50 while the lower portion is connected to the retrieval opening 12 of the casing 10.

Figure 6:
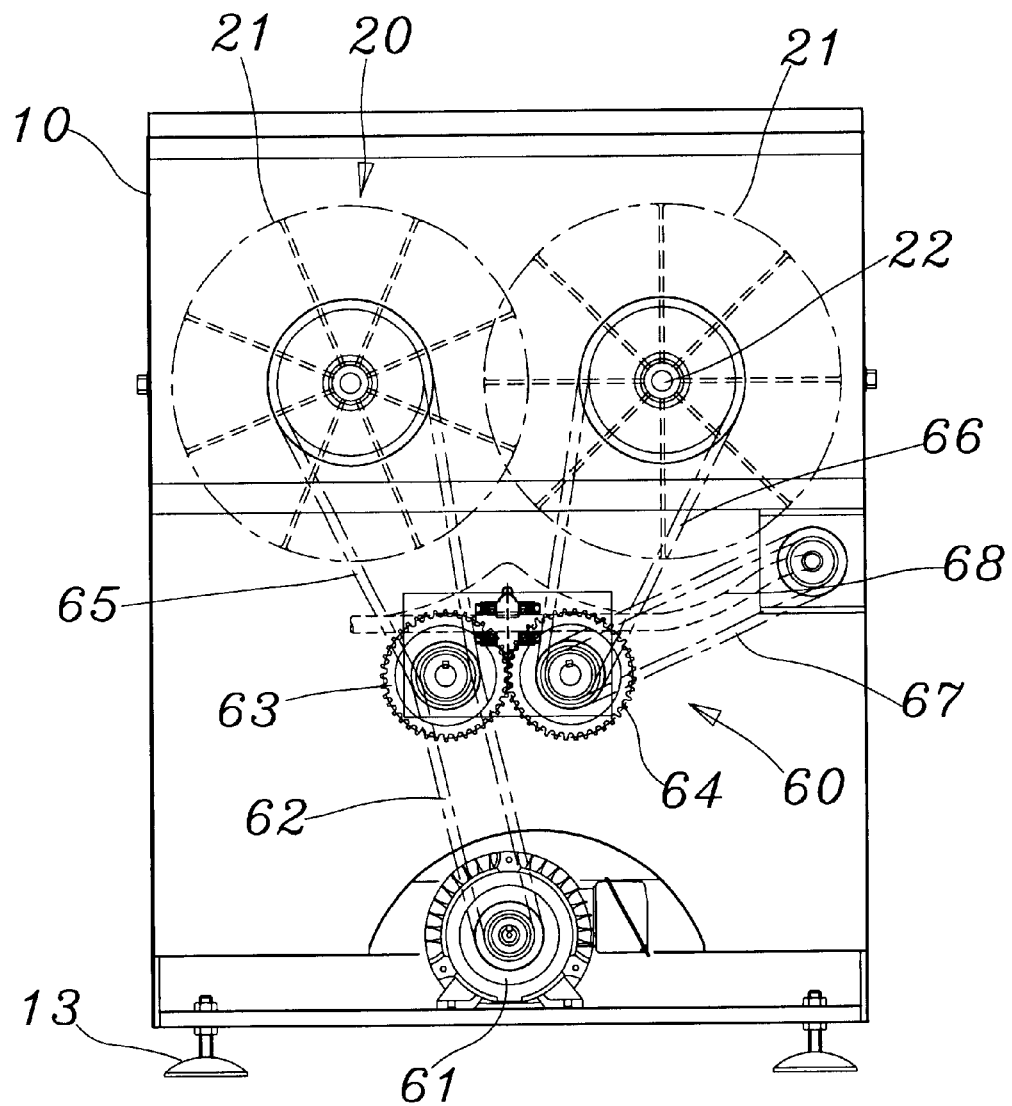
FIG. 6 is schematic view illustrating the driving unit according to an embodiment of the invention.

The driving unit 60 comprises a motor 61 (see FIG. 6) that is mounted inside the casing 10. The motor 61 is connected to a first toothed wheel 63 trough a transmission element such as a first belt pulley assembly 62, the first toothed wheel 63 engaging a second toothed wheel 64. The first and second toothed wheels 63, 64 are respectively connected to the axles 22 of the two scraping brushes 21 via other transmission element such as a second belt pulley assembly 65 and a third belt pulley assembly 66.

The rotation of the motor 61 is thereby transmitted through the belt pulley assembly 62 to the first toothed wheel 63 that, by engagement, consequently drives the second toothed wheel 64 in opposite rotation. As a result, via the second and third belt pulley assemblies 65, 66, the two scraping brushes 21 are driven in opposite rotation to feed in the fish body to be processed.

The second toothed wheel 64 is further connected to the rotary axle 52 of the cutting unit 50 via a transmission element including a fourth belt pulley assembly 67 and a transmission strip 68. The rotary axle 52 is thereby connected to the driving unit 60 to drive the cutting unit 50 in rotation to cut the belly of the fish body and remove its viscera.

Figures 9, 10:
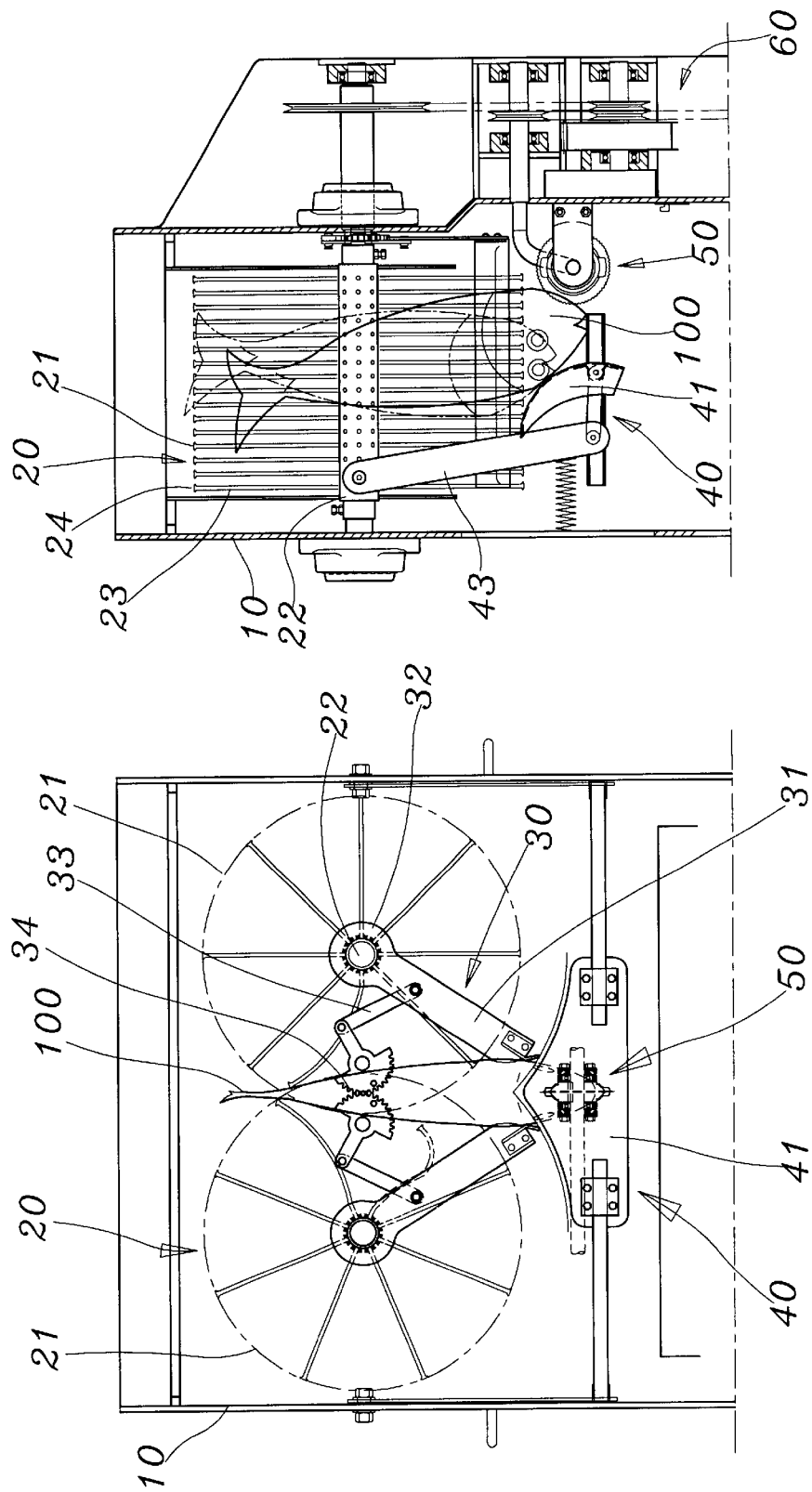
Figure 11:
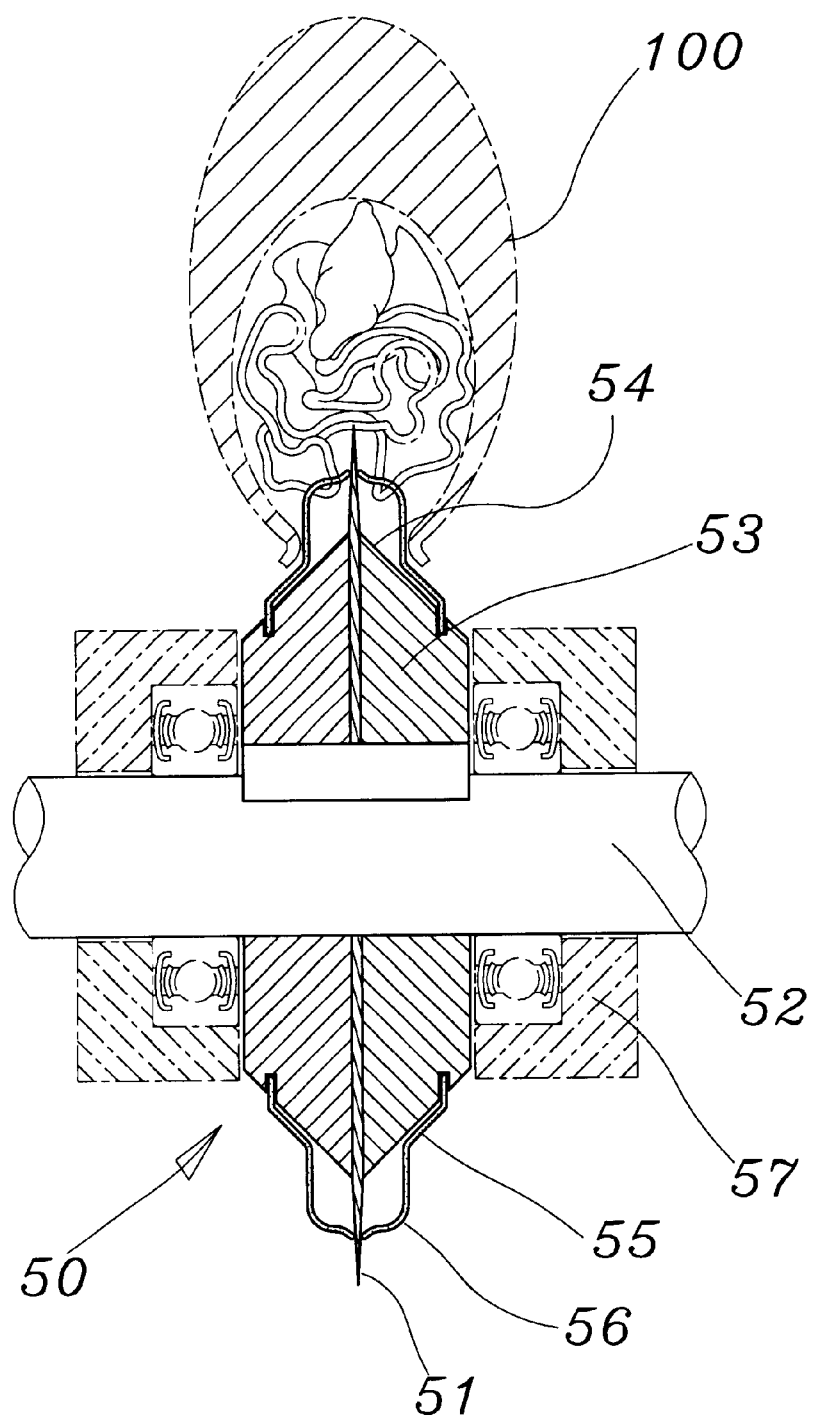
Figure 12:
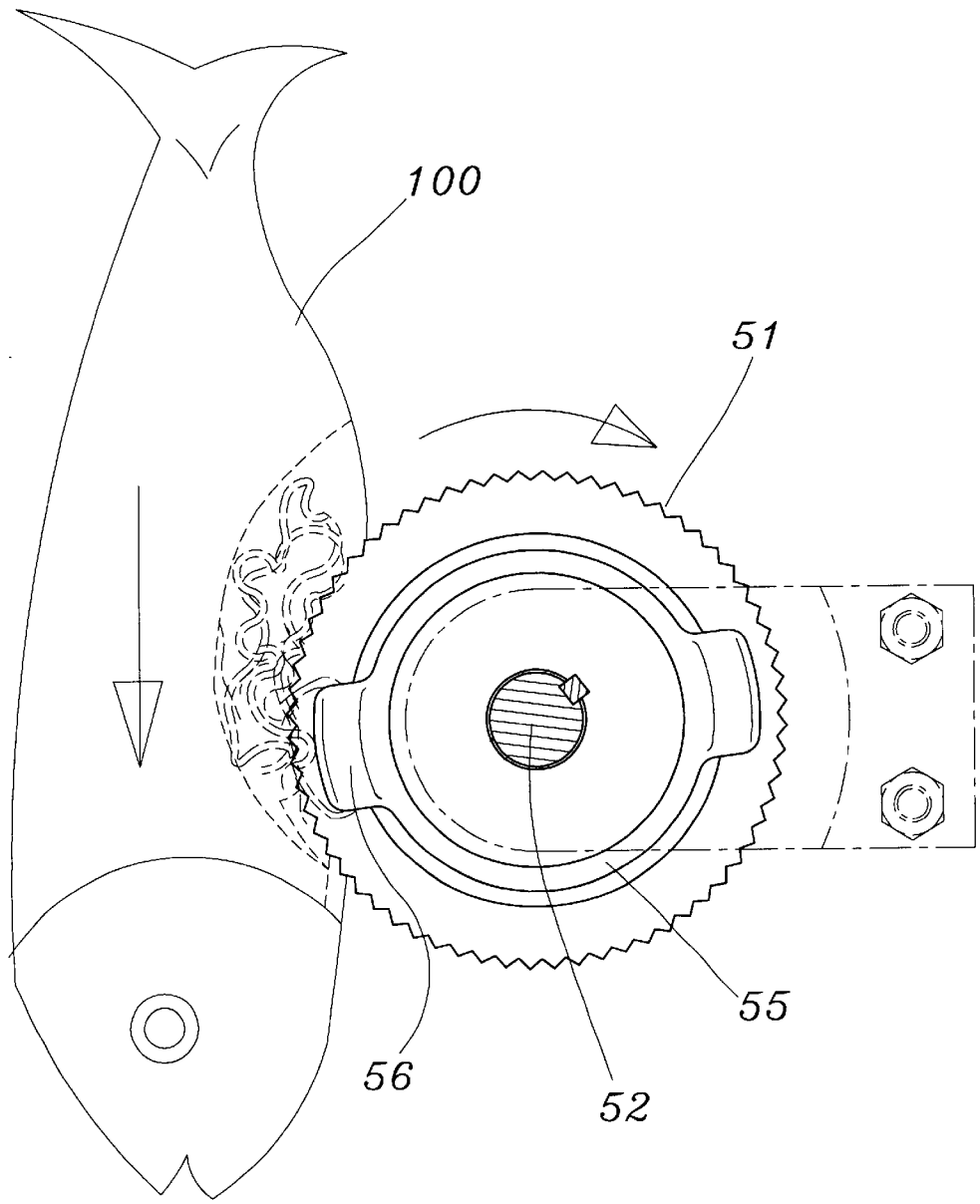
Figure 13:
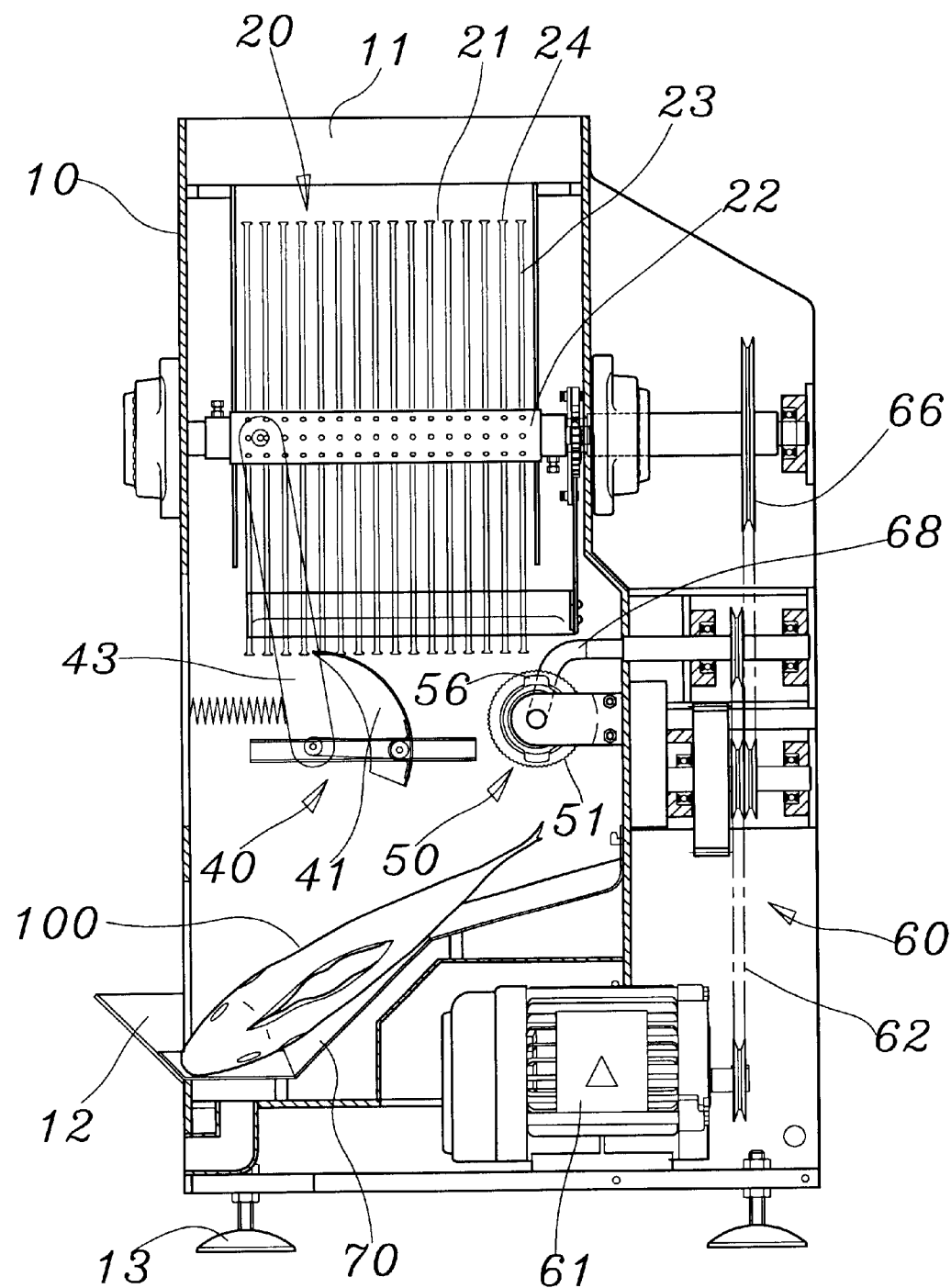

As illustrated in FIG. 7 through FIG. 8, a fish body 100 to be processed is placed inside the processing apparatus through the insert opening 11 of the casing 10. The fish body 100 then is fed in through the scraping brushes 21 that remove the scales of the fish body 100 (see FIG. 7A). Thereafter, the fish body 100 is released and drops on the clamping arms 31, which forces a certain opening of the clamping arms 31 through which the fish body 100 partially extends downward. The clamping arms 31 thereby retain the fish body 100 while the pushing plate 41 adequately positions the fish body 100 and pushes it toward the cutting unit 50 (see FIG. 10). As illustrated in FIG. 11 and FIG. 12, the rotation of the cutting blade 51 cuts open the belly of the fish body 100 while, at the same time, the protruding portions 56 of the scraping rings 55 remove the viscera of the fish body 100. Thereafter, the fish body 100 finally drops down on the receiving tray 70 (see FIG. 13) that guides the fish body 100 to the retrieval opening 12 of the casing 10.

As described above, the invention therefore provides a fish processing apparatus that is entirely automated and is capable of achieving the processing of a fish within a time interval of about 0.4 sec. The bristles 23, being flexible, can process fishes of different size and further do not damage the skin of the fish being processed.

Furthermore, the clamping unit 30 and the pushing unit 40 of the processing apparatus are capable of adequately positioning the fish being processed whether it is an alive or already dead. As a result, the cutting and viscera removal operations can be adequately performed in optimal conditions.

The invention therefore can overcome the disadvantages of the fish processing device of the prior art that needs a longer processing time, is strictly adapted to a certain size of the fish, and may damages the skin of the fish.

Those skilled in the art will readily appreciate that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A fish processing apparatus for processing a fish body, comprising a casing;

a brushing unit, mounted in the casing, the brushing unit comprising two scraping brushes facing each other, each of the scraping brushes having an axle thereon, the two scraping brushes respectively having a plurality of flexible bristles, the flexible bristles each having a scraping portion, and the two scraping brushes being mounted overlapping each other;

a clamping unit, mounted at a location between and below the two scraping brushes, and having two clamping arms that are mounted facing each other, an end of each of the clamping arms being respectively pivotally connected to the axle of each of the scraping brushes so that the two clamping arms are capable of closing or opening relative to each other;

a pushing unit, mounted below the clamping unit;

a cutting unit, mounted at one side of the pushing unit and having a rotary cutting tool and at least a scraping ring used to remove a viscera of a fish body; and a driving unit, connected to the respective axles of the scraping brushes and to the cutting unit.

2. The apparatus of claim 1, wherein the casing has an insert opening and a retrieval opening, and a bottom side of the casing has a plurality of support pads.

3. The apparatus of claim 1, further comprising two actuating rods respectively being connected with an end of the each clamping arm, and two actuating toothed wheels respectively being connected to another end of the each clamping arm and the two actuating toothed wheels engaging each other.

4. The apparatus of claim 1, wherein the pushing unit has a pushing plate, two connecting rods respectively connected with two opposite portions of the pushing plate, one oscillating bar further being connected with another end of the connecting rod and the one oscillating bar having one end pivotally connected to the casing according to a flexible manner, the pushing unit pushing the fish body toward the cutting unit.

5. The apparatus of claim 1, further comprising a rotary axle being connected with the cutting tool and the driving unit, a fixing plate with a conical surface being respectively mounted at two sides of the cutting tool, the scraping ring being placed at an outer side of the fixing plate, the scraping ring being made of plastics and having at least a protruding portion, a plurality of locking elements being used for securing the fixing plate being attached to the cutting tool.

6. The apparatus of claim 1, further comprising a receiving tray having an inclined section which is mounted below the cutting unit, a high portion of the inclined section being vis-à-vis the cutting unit.

7. The apparatus of claim 1, wherein the driving unit has a motor, a first belt/wheel assembly being connected with the motor and a first toothed wheel being connected with the first belt pulley assembly, a second toothed wheel engaging the first toothed wheel, a second belt pulley assembly being connected with the first wheel and the axle of the one scraping brush, a third belt pulley assembly connected with the second toothed wheel and another axle of the another scraping brush.

8. The apparatus of claim 7, further comprising a fourth belt/wheel assembly and a transmission strip respectively being connected with the second toothed wheel and the rotary axle of the cutting unit.

* * * * *